US012599107B2

(12) United States Patent
    Morfeldt

(10) Patent No.: US 12,599,107 B2
(45) Date of Patent: Apr. 14, 2026

(54) MATTRESS FOR LIVESTOCK

(71) Applicant: Morfeldt Geotechnology AB, Figeholm (SE)

(72) Inventor: Caj Morfeldt, Figeholm (SE)

(73) Assignee: Morfeldt Geotechnology AB, Figeholm (SE)

( * ) Notice: Subject to any disclaimer, the term of this patent is extended or adjusted under 35 U.S.C. 154(b) by 0 days.

(21) Appl. No.: 18/812,254

(22) Filed: Aug. 22, 2024

(65) Prior Publication Data

US 2025/0064013 A1     Feb. 27, 2025

(30) Foreign Application Priority Data

Aug. 23, 2023    (SE) ..................................... 2350992-0

(51) Int. Cl.
    *A01K 1/015*          (2006.01)
(52) U.S. Cl.
    CPC .................................. *A01K 1/0157* (2013.01)
(58) Field of Classification Search
    CPC ... A47C 21/046; A47C 27/006; A47C 27/007; A01K 1/0157; A61G 9/00; A61G 9/003
    See application file for complete search history.

(56) References Cited

U.S. PATENT DOCUMENTS

| | | | | | |
|---|---|---|---|---|---|
| 1,490,535 | A | * | 4/1924 | Moore | .................... D03D 15/56 |
| | | | | | 139/421 |
| 1,566,787 | A | * | 12/1925 | Brandwein | .......... A47C 21/046 |
| | | | | | 5/724 |

| | | | | | |
|---|---|---|---|---|---|
| 1,691,629 | A | * | 11/1928 | Kusterle | ............... A47C 21/046 |
| | | | | | 5/724 |
| 2,224,687 | A | * | 12/1940 | Light | ................... A47C 21/046 |
| | | | | | 5/724 |
| 3,513,492 | A | * | 5/1970 | Phillips | .................. A47C 7/742 |
| | | | | | 297/452.44 |
| 3,761,131 | A | * | 9/1973 | Oliver | .................. A47C 27/086 |
| | | | | | 5/652 |
| 4,163,297 | A | * | 8/1979 | Neumark | ........... A61G 7/05738 |
| | | | | | 5/702 |
| 4,843,666 | A | * | 7/1989 | Elesh | ................... A47C 27/148 |
| | | | | | 5/738 |
| 5,363,524 | A | * | 11/1994 | Lang | .................... A47G 9/1081 |
| | | | | | 5/951 |
| 5,408,711 | A | * | 4/1995 | McClelland | ......... A47C 21/046 |
| | | | | | 5/724 |

(Continued)

FOREIGN PATENT DOCUMENTS

| | | | | |
|---|---|---|---|---|
| CN | | 2704596 Y | * | 6/2005 |
| DE | | 1836799 U | | 8/1961 |

(Continued)

OTHER PUBLICATIONS

CN 2704596 and merged translation (Year: 2005).*

(Continued)

*Primary Examiner* — Marisa V Conlon
(74) *Attorney, Agent, or Firm* — Capitol City TechLaw

(57)          ABSTRACT

A mattress for livestock may include a casing at least partially filed with sand. One or more drains may be provided to allow liquid to drain through the mattress. A water permeability of the one or more drains may be larger than a water permeability of the mattress at portions surrounding the drains.

10 Claims, 5 Drawing Sheets

100

105    101

A 106      102

B

104

B      103      A

(56)          References Cited

U.S. PATENT DOCUMENTS

| | | | | | | |
|---|---|---|---|---|---|---|
| 5,697,113 | A | * | 12/1997 | Shatz | .................... | A47C 21/046 |
| | | | | | | 5/655 |
| 5,701,846 | A | * | 12/1997 | Parker, IV | ........... | A01K 1/0157 |
| | | | | | | 119/28.5 |
| 5,713,089 | A | * | 2/1998 | Ferrante | ............... | A47G 9/0207 |
| | | | | | | 5/923 |
| 6,058,536 | A | * | 5/2000 | Henry | .................... | A47C 27/12 |
| | | | | | | 5/691 |
| 7,334,280 | B1 | * | 2/2008 | Swartzburg | .......... | A47C 21/046 |
| | | | | | | 5/724 |
| 7,682,994 | B2 | * | 3/2010 | Van Emden | ......... | D03D 15/283 |
| | | | | | | 442/79 |
| 8,486,847 | B2 | * | 7/2013 | Fan | ........................ | D03D 11/00 |
| | | | | | | 442/205 |
| 9,635,897 | B2 | * | 5/2017 | Prust | ...................... | A43B 13/38 |
| 9,943,173 | B2 | * | 4/2018 | Krtek | .................. | A47C 21/046 |
| 2018/0235375 | A1 | * | 8/2018 | Garcia | ................... | A47C 27/00 |

FOREIGN PATENT DOCUMENTS

| | | | | | | |
|---|---|---|---|---|---|---|
| JP | 2010522836 | A | * | 7/2010 | .......... | D03D 13/004 |
| TR | 201713573 | A2 | * | 10/2017 | | |
| WO | 8600781 | A1 | | 2/1986 | | |
| WO | 2008086798 | A1 | | 7/2008 | | |

OTHER PUBLICATIONS

TR 201713573 and merged translation (Year: 2017).*
JP 2010522836 and merged translation (Year: 2010).*
DE 20309793 with merged translation (Year: 2003).*

* cited by examiner

100

102

C

201

103

MATTRESS FOR LIVESTOCK

This application claims priority under 35 USC 119(a)-(d) from Swedish Patent Application No. 2350992-0 filed Aug. 23, 2023, the entire contents of which are incorporated herein by reference.

BACKGROUND

1. Technical Field

The present invention relates to a mattress for livestock, more particularly to a mattress comprising sand, and a method of manufacturing the same.

2. Discussion of Related Art

In agriculture, the care and management of livestock play a pivotal role in ensuring their health, productivity, and overall welfare. One essential aspect of ensuring the health and welfare of livestock is the provision of a suitable and comfortable lying surface for the animals to rest upon.

Conventionally, livestock are provided with resting areas that historically have often consisted of compacted soil, concrete floors, or bare ground within their enclosures or barns. These rudimentary resting surfaces, while serving the basic purpose of giving animals a place to rest, are often far from optimal in terms of comfort, support, and hygiene. These surfaces can lead to discomfort, physical stress, and even health issues for the animals due to pressure points, cold and damp conditions, and inadequate support for their bodies.

Uncomfortable or inadequate lying surfaces have been associated with reduced feed intake, decreased milk production in dairy cows, and increased susceptibility to injuries and diseases. Furthermore, the quality of livestock bedding also affects the hygienic conditions of the farm environment, impacting both animal health and worker safety.

Known improvements to these rudimentary resting surfaces include rubber mattresses. However, rubber mats often lack the necessary depth and density to provide adequate cushioning and support for the body weight of livestock, and in particular larger livestock such as cows or horses. The lack of proper support can lead to pressure points and discomfort, which can in turn lead to decreased rest quality and potential health issues for the animals.

Therefore, there is a need for improved resting surfaces for livestock that can overcome at least some of the above-described challenges.

SUMMARY

The invention is defined by the appended independent claims. Additional features and advantages of the concepts disclosed herein are set forth in the description which follows, and in part will be clear from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

In a first aspect, there is provided a mattress for livestock, the mattress comprising: a casing filled with sand; and one or more drains configured to allow liquid to drain through the mattress, wherein a water permeability of the one or more drains is larger than a water permeability of the mattress at portions surrounding the drains.

The mattress may advantageously be used in agriculture to provide a resting and/or sleeping place for livestock. The mattress is comfortable and ergonomic for the animals while able to sustain movement of livestock on the mattress without damaging the mattress. The mattress according to embodiments is thus a resting surface for livestock that promotes the physical comfort, health, and productivity of livestock while also enhancing the overall efficiency and sustainability of farm operations. The mattress, in turn, thus increases feed intake as well as milk production in dairy cows, while decreasing susceptibility to injuries and diseases.

The drains ensure that liquid drains through the mattress in a more efficient manner. The drains thus reduce the amount of liquid that remains on the mattress during use, ensuring that the mattress does not become slippery. A risk of animals injuring themselves when using the mattress is accordingly reduced.

It will be appreciated that the drains are not essential (i.e. embodiments include mattresses without drains as well), for example if the water permeability of the casing in itself is sufficient to adequately drain liquid on the mattress.

Preferably, the casing comprises a first layer and a second layer encasing the sand, wherein the drains are formed by respective portions of at least one of the first and second layers having an increased water permeability. Hence, the drains are an integral part of the casing, reducing the complexity of the mattress and its manufacturing.

Preferably, the first layer and/or second layer of the casing is made of a water permeable material. The casing, and not only the portions corresponding to the drains, being water permeable allows even further drainage of liquid through the mattress. The mattress, and the sand therein, can furthermore be cleaned while the sand is located in the mattress, because water is allowed to both permeate into and out of the casing.

Preferably, the first layer and/or second layer of the casing is made of a woven material. Preferably, the one or more drains are formed by portions of the first layer and/or second layer having less dense weaving than surrounding portions of the first layer and/or second layer. For example, the one or more drains may be formed by floating warp threads and/or floating weft threads in the first layer and/or second layer. This type of drains reduces the manufacturing cost and does not require any additional manufacturing equipment.

Preferably, each of the drains is confined by a seam between the first layer and the second layer. The seam ensures that the sand cannot reach the drains, allowing a less dense weaving to be used for the drains without allowing sand to escape through the less dense weaving. The seam may additionally function to reduce the thickness of the mattress at the drains, so as to create a local or global minimum thickness at the drains, which ensures that liquid falls into the drains.

Preferably, the sand comprises silica and/or quartz, optionally at least 70 wt % silica and/or quartz, optionally at least 80 wt % silica and/or quartz, optionally at least 85 wt % silica and/or quartz, optionally at least 90 wt % silica and/or quartz. Sand comprising silica and/or quartz is particularly resistant to wear, deterioration, weathering, grinding, milling, or the like. Thus, the risk of self-grinding of the sand (i.e. grinding of the sand by means of grains moving and/or wearing against each other) when livestock steps on, moves on, lies on, and/or otherwise uses the mattress may be reduced.

Preferably, at least 90 wt %, optionally at least 95 wt %, optionally at least 98 wt %, of the sand has a grain size between 0.250 mm and 1.000 mm. Additionally, or alternatively, the sand has an average grain size between 0.354 mm and 0.707 mm, optionally between 0.354 mm and 0.500 mm. Preferably, the sand has a bulk density between 0.5 and 4 g per cubic centimetre, optionally between 0.7 and 2.5 g per cubic centimetre, optionally between 0.9 and 2.0 g per cubic centimetre, optionally between 1.0 and 1.6 g per cubic centimetre.

This grain size and density offers a mattress that is comparably ergonomic, soft and comfortable for livestock to lie on, ensuring that the animals are keen to use the mattress.

Preferably, the casing is made from a polymer material, wherein optionally the polymer material comprises polyester. These materials increase the strength and resilience of mattress improving the ability of the mattress to withstand movement of the animals on the mattress without substantial damage.

Preferably, an inside of the casing comprises a plurality of compartments, wherein each compartment is substantially filled with sand.

The compartments ensure an even distribution of sand throughout the mattress, which prevents all of the sand from accumulating in a single part of the mattress.

Preferably, the casing comprises an opening that can be repeatedly opened and closed.

The opening allows the mattress to be filled with sand while also allowing the sand to be replaced and/or cleaned after use, for example, if the sand has become unhygienic due to urination of the animals.

In a second aspect, there is provided a method of manufacturing a mattress for livestock, the method comprising: providing a mattress comprising a casing and one or more drains, the drains being configured to allow liquid to drain through the mattress, wherein a water permeability of the one or more drains is larger than a water permeability of the mattress at portions surrounding the drains; and filling the casing with sand.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Further, in the figures like reference characters designate like or corresponding elements or parts throughout the several figures. The first digit in the reference character denotes the first figure in which the corresponding element or part appears.

DETAILED DESCRIPTION

Figure 1:
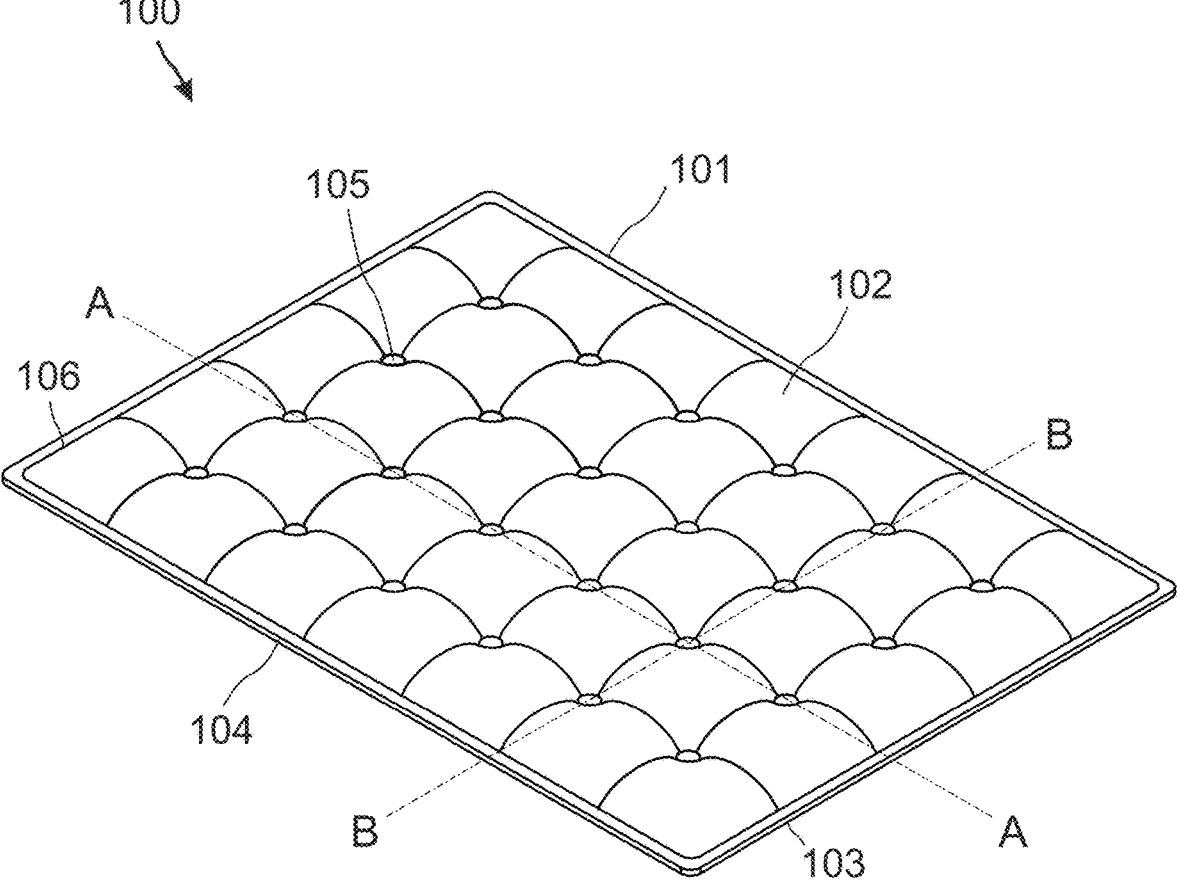
FIG. 1 shows a perspective view of a mattress according to embodiments.

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the claimed invention.

Hereinafter, certain embodiments will be described more fully with reference to the accompanying drawings. It will be apparent to those skilled in the art that various modifications and variations can be made without departing from the inventive concept. Other embodiments will be apparent to those skilled in the art from consideration of the specification and practice disclosed herein. It is to be understood that elements and materials may be substituted for those illustrated and described herein, parts and processes may be reversed or omitted, certain features may be utilized independently, and embodiments or features of embodiments may be combined, all as would be apparent to the skilled person in the art.

The embodiments herein are provided by way of example so that this disclosure will be thorough and complete, and will fully convey the scope of the inventive concept, and that the claims be construed as encompassing all modifications, equivalents and alternatives of the present inventive concept which are apparent to those skilled in the art to which the inventive concept pertains. If nothing else is stated, different embodiments may be combined with each other.

The present disclosure relates to a mattress for livestock, and in particular to a mattress for cows. The mattress according to embodiments may be used in agriculture. The mattress may provide a resting and/or sleeping place for livestock. Thus, it needs to be comfortable and ergonomic for the livestock to lie on the mattress. The mattress is also configured to sustain movement of livestock on the mattress (e.g. livestock stepping on the mattress) without damaging the mattress.

The term "livestock" as used herein refers to any animal kept by humans for a useful and commercial purpose. This includes animals kept for food or production of food (e.g. meat through slaughtering and/or milk through milking), animals kept for pulling and/or carrying of loads (e.g. working animals and/or draft animals), and/or animals kept for production of hides, skin, leather, fleece, wool, or the like. Livestock may also be referred to as agricultural animals and/or domesticated animals raised for agriculture.

In embodiments, the term livestock includes animals such as horses, bovines, cattle (e.g. beef cattle and/or dairy cattle), cows, oxen, buffalos, water buffalos, yaks, bison, sheep, goats, lambs, pigs, swine, deer, reindeer, camels, llamas, alpacas, mules, and/or donkeys. In embodiments, the term livestock may exclude poultry and/or fish.

Because livestock are typically large and/or heavy animals, with the weight of an animal reaching up to 1000 kg, the mattress according to embodiments needs to be very strong and resilient, while also providing sufficient softness and comfort for livestock lying thereon. A mattress for livestock thus has fundamentally different requirements compared to traditional mattresses (e.g. for humans).

Mattresses according to embodiments are particularly advantageous for livestock with an animal weight (per animal) of at least about 50 kg, optionally at least about 100 kg, optionally at least about 200 kg, optionally at least about 300 kg, optionally at least about 400 kg, optionally at least about 500 kg.

Mattresses according to embodiments are, in particular, advantageous for cows. If the mattresses are intended to be used with cows, the mattresses according to embodiments may be referred to as cow mattresses.

FIG. 1 shows a perspective view of a mattress 100 for livestock according to embodiments. The mattress 100 comprises a casing 101 filled with sand 201, and optionally one or more drains 105.

The casing 101 is configured to encase or enclose the sand 201. The casing 101 is configured to ensure that the sand 201 remains in the casing 101 during use of the mattress 100. The casing 101 may thus be referred to as a closed or closable casing 101.

The casing 101 is preferably formed by two layers or sheets, an upper layer 102 with which the livestock is intended to interact, and a lower layer 103 which, in use, is configured to be placed on the ground or the like.

The upper layer 102 may be joined to the lower layer 103 at a circumferential portion of the mattress 100. For example, a seam 104 joining the upper layer 102 and lower layer 103 may be provided around an outer edge of the mattress 100.

The casing 101, and in particular the upper layer 102 and/or lower layer 103, is preferably made from a woven material. The upper layer 102 and/or lower layer 103 thus preferably comprises fibres woven into a sheet or the like. The woven material is preferably sufficiently tightly woven to ensure that substantially no sand grains can escape between the fibres of the woven material (e.g. between gaps between adjacent threads of the woven material). As an alternative, the casing 101, and in particular the upper layer 102 and/or lower layer 103, may be made of an integral material such as rubber.

The casing 101, and in particular the upper layer 102 and/or lower layer 103, is preferably made from a polymer material, such as rubber and/or plastics. The polymer material may comprise one or more plastic materials, such as polyester. Preferably, the casing 101, and in particular the upper layer 102 and/or lower layer 103, is made from polyester, and more preferably from woven polyester.

In embodiments, the upper layer 102 and/or lower layer 103 may be made from a sheet of woven polyester having a weight of at least 200 grams per m2, optionally at least 300 grams per m2, optionally at least 350 grams per m2, optionally at least 400 grams per m2. This ensures that the mattress 100 is sufficiently strong and resilient to withstand movement of the animals on the mattress 100 without any substantial damage.

The casing 101, and in particular the upper layer 102 and/or lower layer 103, is preferably at least partially water permeable. That is, the casing 101, and in particular the upper layer 102 and/or lower layer 103, is preferably made from a water permeable material. The water permeability may be an intrinsic property of the material. Alternatively, or additionally, the water permeability may arise from the manufacturing method of the material, e.g. by gaps between woven fibres or threads.

The mattress 100 may have any suitable size and shape that allows livestock to rest thereon. For example, the mattress 100 may be sized and shaped in dependence on the species of animal that is intended to use the mattress 100.

The mattress 100 may have a substantially rectangular shape. Alternatively, the mattress 100 may for example have a polygonal shape, an oval or elliptic shape, and/or a circular shape.

When the mattress 100 is intended for use with larger animals, such as cows, the mattress may have an area of at least 1.5 m2, optionally at least 2.0 m2, optionally at least 2.2 m2. For example, the mattress 100 may have a length of at least 1.5 m, optionally at least 1.75 m, optionally at least 1.9 m, a width of at least 0.8 m, optionally at least 1.0 m, optionally at least 1.2 m. The mattress 100 may further have a maximum thickness of at least 5 cm, optionally at least 10 cm, optionally at least 15 cm, optionally at least 20 cm. The mattress 100 may have an average thickness of at least 3 cm, optionally at least 5 cm, optionally at least 8 cm, optionally at least 10 cm.

The mattress 100 preferably comprises one or more drains 105. Preferably, the mattress 100 comprises a plurality of drains 105. The drains 105 are configured to allow liquid (e.g. water, rain, urine) to drain through the mattress 100 in an efficient manner. This is achieved by the drains 105 having a water permeability that is larger than a water permeability of the rest of the mattress 100 (e.g. at portions of the mattress 100 surrounding the drains).

The drains 105 thus ensure that less, or no, liquid (e.g. water, rain, urine) stays on the mattress 100 during use, and instead allow the liquid to pass through the mattress 100 more efficiently into the ground or the like. Hence, the drains 105 ensure that the mattress 100 does not become slippery if wet, for example when it rains or when livestock urinates. A risk of animals injuring themselves when using the mattress 100 (e.g. by the animals slipping) is accordingly reduced.

Preferably, the drains 105 are provided at locations of the mattress 100 where the mattress 100 has a local or global minimum thickness (i.e. minimum distance between the upper layer 102 and lower layer 103). In other words, the mattress 100 preferably has a smaller thickness at or close to the drains 105 than elsewhere (e.g. than at portions surrounding the drains 105). Thus, when the mattress 100 is placed flat on the ground, and in particular when an animal lies thereon (so as to press the mattress 100 and in particular the drains 105 to the ground), a downward slope to the drains 105 is present causing liquid on the mattress 100 to fall down to (or into) the drains 105.

The drains 105 may be provided in a regular pattern, for example in rows and columns. The number of drains 105, the size of the drains 105 and/or the positioning of the drains 105 may be determined in dependence on conditions of use for the mattress 100, such as its likeliness of becoming wet. For example, the drains 105 may be dimensioned in dependence on whether the mattress 100 is intended to be used indoors or outdoors.

In embodiments, the drains 105 may be spaced apart by a distance between 10 and 80 cm, preferably between 15 and 50 cm, preferably between 15 and 30 cm, preferably about 20 cm. The distance may be a center-to-center distance between two adjacent drains 105.

The mattress 100 may comprise an opening (not shown), and preferably a resealable opening (i.e. an opening that can be repeatedly opened and closed), for allowing the mattress 100 to be filled with sand. For example, the opening may comprise a zipper allowing the opening to be repeatedly opened and closed. When filling the mattress 100, the opening may be opened so as to allow sand 201 to be inserted into the casing 101, after which the opening may be closed and/or sealed to ensure that the sand 201 in enclosed in the casing 101.

A resealable opening also allows the sand 201 to be replaced and/or cleaned after use, for example if the sand 201 has become unhygienic due to urination of the animals or the like.

The casing 101 may further comprise a plurality of (internal) compartments (not shown), each compartment being filled with sand 201. That is, the casing 101 may be divided or partitioned into a plurality of separate chambers or volumes containing sand 201.

The compartments thus ensure an even distribution of sand 201 throughout the mattress. In other words, the compartments prevent all of the sand 201 from accumulating in one or several parts of the mattress 101.

The compartments may be formed by joining the upper layer 102 and the lower layer 103 of the casing 101 along one or more connection lines. For example, connection lines may be provided to form a grid of compartments (e.g. rows and columns of compartments). Adjacent compartments in the rows and/or columns may be connected to each other via connection openings provided along part of the connection lines. The rows and/or columns may also be connected to the resealable opening so as to allow all compartments to be filled with sand 201.

It will be appreciated that further threading may be provided between the upper layer 102 and lower layer 103, including the use of spacers, reinforcement threads, point-like connections, webs and the like, as will be understood by the person skilled in the art.

Figure 2:
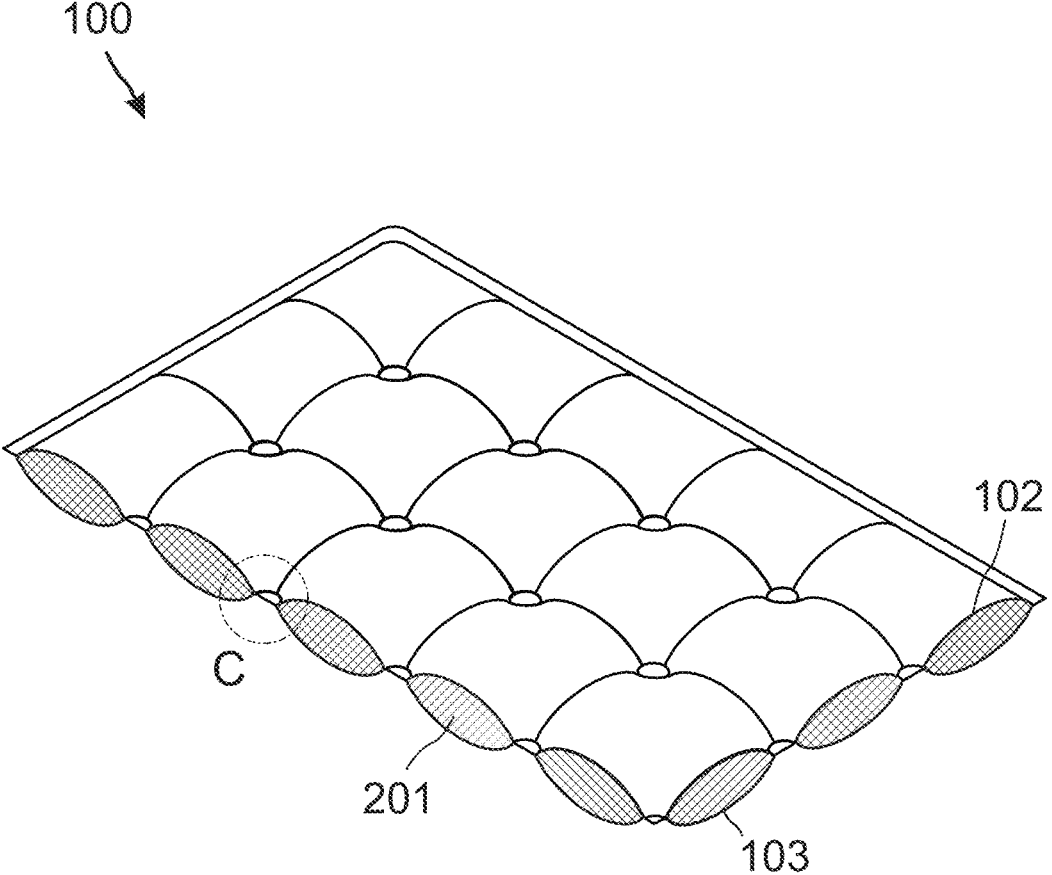
FIG. 2 shows a cross-section of a mattress according to embodiments.

FIG. 2 shows a cross-section of the mattress 100 along axes A and B of FIG. 1. The casing 101 is filled with sand. That is, the casing 101 is completely, substantially, and/or partly filled with sand 201. In other words, inside the casing 101 there may, or may not, be empty space (e.g. air). In embodiments, the mattress 100 is preferably at least semi-filled with sand 201 (i.e. filled to at least 50%), preferably filled to at least three-quarters (i.e. 75%) with sand 201, preferably substantially filled with sand 201 (e.g. filled to at least 90% or 95% with sand 201).

The term "sand" as used herein refers to a granular material of, primarily or substantially only, mineral particles. A granular material may be defined as a conglomeration of discrete solid, macroscopic particles. In other words, the grains of sand are free to move relative to each other, as opposed to aggregates fixed in a matrix material (such as concrete).

Sand 201 may be defined as having grains and/or particles with a diameter (or grain size) of between 0.0625 mm and 2 mm as defined in the international standard ISO 14688. Sand 201 is thus different from gravel which is typically defined as having a particle diameter of 2 mm to 64 mm and slit which is typically defined as having a particle diameter of 0.004 mm to 0.0625 mm.

Sand grains may further be classified as fine, medium, and coarse in accordance with the international standard ISO 14688. Fine sand may be defined as a grain diameter between 0.0625 mm to 0.2 mm. Medium (or medium coarse) sand may be defined as a grain diameter between 0.2 mm to 0.625 mm. Coarse sand may be defined as a grain diameter between 0.625 mm to 2.0 mm.

The sand 201 according to embodiments preferably has a bulk density between 0.5 and 4 g per cubic centimetre, optionally between 0.7 and 2.5 g per cubic centimetre, optionally between 0.9 and 2.0 g per cubic centimetre, optionally between 1.0 and 1.6 g per cubic centimetre, optionally about 1.5 g per cubic centimetre. The bulk density may also be referred to as apparent density and/or volumetric density. The bulk density may be defined as the mass of an amount of sand grains divided by the total volume they occupy, including particle volume, inter-particle void volume, and internal particle pore volume.

The sand 201 preferably comprises silica (e.g. quartz) and/or other silicon oxides. Silica may also be referred to as silicon dioxide. Preferably, the sand 201 comprises at least 70 wt % silica (e.g. quartz), optionally at least 80 wt % silica (e.g. quartz), optionally at least 85 wt % silica (e.g. quartz), optionally at least 90 wt % silica (e.g. quartz).

Because of the chemical inertness and considerable hardness of silica (e.g. quartz), sand 201 comprising silica, and in particular sand 201 comprising a large amount of silica, is particularly resistant to wear, deterioration, weathering, grinding, milling, or the like. Thus, sand 201 comprising silica reduces the risk of and/or substantially avoids self-grinding (i.e. grinding occurring by the grains moving or wearing against each other) when livestock steps on, moves on, lies on, and/or otherwise uses the mattress 100.

The sand 201 may additionally comprise aluminum oxide, ferric oxide, potassium oxide, sodium oxide, or a combination thereof.

In exemplary embodiments, the sand 201 comprises about 70 to 98% silica, about 2 to 8% aluminum oxide, about 0.1 to 2% ferric oxide, about 1 to 4% potassium oxide, and/or about 0.1 to 4% sodium oxide. In exemplary embodiments, the sand 201 comprises about 85 to 95% silica, about 4 to 6% aluminum oxide, about 0.5 to 1.5% ferric oxide, about 1 to 3% potassium oxide, and/or about 0.5 to 2% sodium oxide. For example, the sand 201 may comprise about 90% silica, about 5% aluminum oxide, less than 1% ferric oxide, about 2% potassium oxide, and/or about 1% sodium oxide.

Figure 3:
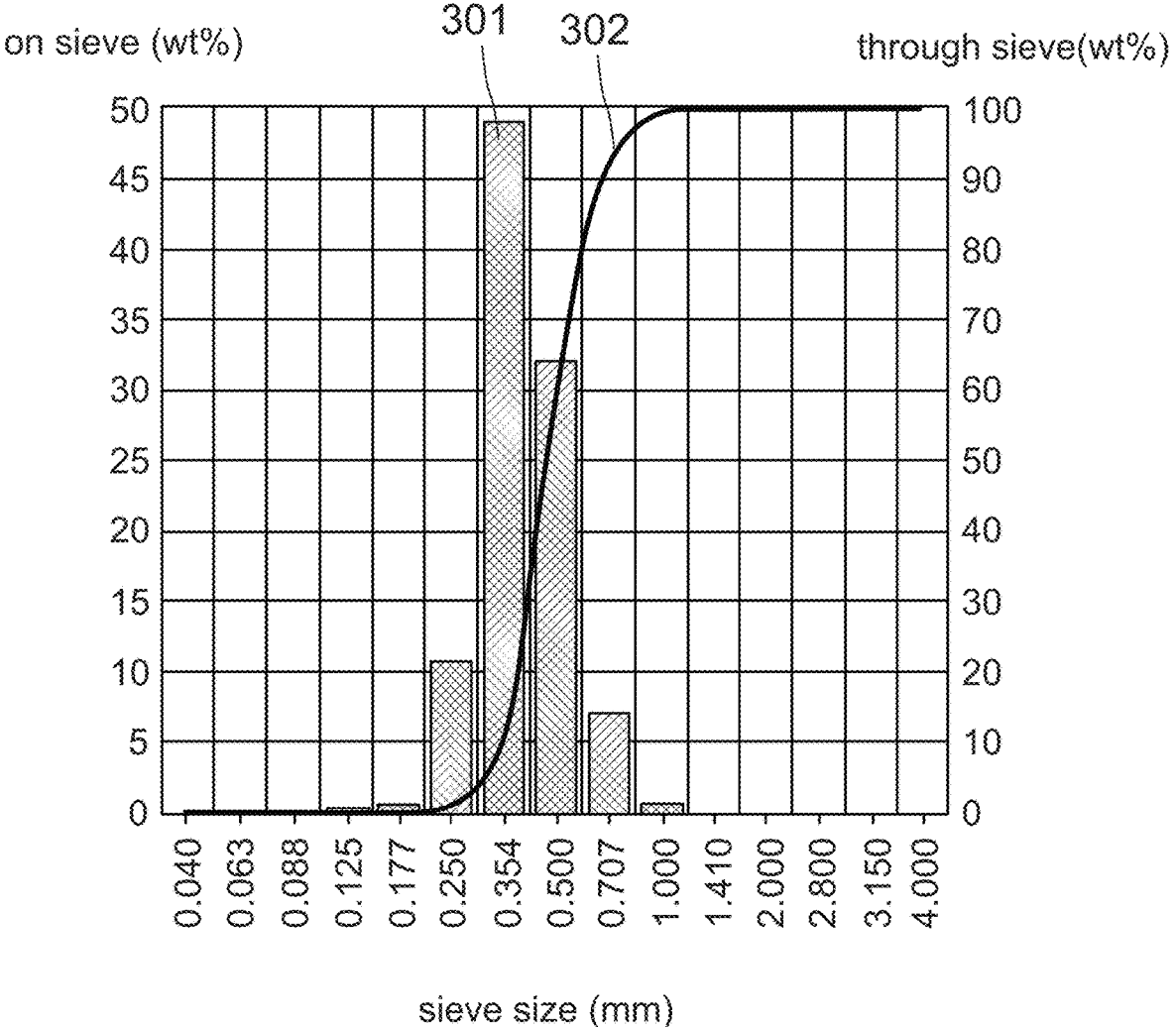
FIG. 3 shows a sieve analysis of sand according to embodiments.

FIG. 3 shows a graph of a sieve analysis of an exemplary sample of sand 201 according to embodiments.

A sieve analysis is performed by arranging a series of sieves in descending order from larger mask (or opening) size at the top to smaller mask (or opening) size at the bottom. In the sieve analysis of FIG. 3, 14 sieves of different sizes were used. The sieve sizes used were, in descending order, 4.000 mm, 3.150 mm, 2.800 mm, 2.000 mm, 1.410 mm, 1.000 mm, 0.707 mm, 0.500 mm, 0.354 mm, 0.250 mm, 0.177 mm, 0.125 mm, 0.088 mm, and 0.063 mm.

A sand sample is passed through the series of sieves causing sand grains having a respective size being retained on the respective sieve. For example, a sand grain having a grain size of 0.6 mm, will pass through the first 7 sieves and be retained on the sieve with a mask size of 0.500 mm.

After the sand 201 has been passed through the series of sieves, the weight of sand 201 retained on each sieve is measured.

FIG. 3 shows the weight percentage of sand 201 being retained on a respective sieve using hatched bars 301. The scale for sand 201 retained on each respective sieve is indicated to the left. FIG. 3 also shows the weight percentage of sand 201 having passed through a respective sieve using a solid thick line 302. The scale for sand 201 having passed through each respective sieve is indicated to the right.

As can be seen in FIG. 3, a majority of the sand 201 has a grain size of 0.354 mm to 0.707 mm. In embodiments, an average grain size (averaged by weight) may be between 0.354 mm and 0.707 mm, optionally between 0.354 mm and 0.500 mm.

The grain size may be defined as the maximum size of a grain that can pass through a sieve with the corresponding mask size (according to the above-described sieving analysis method). Hence, the grain size may be defined as a diameter (e.g. a minimum dimension and/or a maximum dimension) of a grain of sand 201.

In embodiments, the sand 201 may be medium and/or coarse sand.

In embodiments, at least 90 wt %, optionally at least 95 wt %, optionally at least 98 wt %, optionally at least 99 wt %, of the sand 201 may have a grain size between 0.177 mm and 1.410 mm.

In embodiments, at least 90 wt %, optionally at least 95 wt %, optionally at least 98 wt %, of the sand 201 may have a grain size between 0.250 mm and 1.000 mm.

In embodiments, at least 70 wt %, optionally at least 75 wt %, optionally at least 80 wt %, of the grains of sand 201 may have a grain size between 0.354 mm and 0.707 mm.

In embodiments, at least 90 wt % of the grains of sand may have a grain size below 1.410 mm, optionally below 1.000 mm, optionally below 0.707 mm.

In embodiments, at least 90 wt % of the grains of sand may have a grain size above 0.177 mm, optionally above 0.250 mm, optionally above 0.354 mm.

These grain sizes have been found to offer a mattress 100 that is ergonomic, comparably soft, and comfortable for livestock to lie on, thus ensuring that the animals are keen to use the mattress 100. These grain size further reduces the risk of any sharp grains that can be disturbingly noticed by the animals while allowing the grains to readjust themselves (i.e. moving relative to each other) in dependence on an animal body lying and/or moving thereon.

For example, sand of a too fine grain size has been found to disadvantageously form a compact and dense mattress without sufficient movability of grains relative to each other in response to animals lying and/or moving thereon. Such sand would accordingly feel stiffer (e.g. more rigid, less yielding) when an animal steps on the mattress, as opposed to the more flexible (e.g. yielding, pliable, malleable) mattress using sand of the above-described grain sizes.

On the other hand, sand of too coarse grain size has been found to be disliked by animals, likely because the coarse sand generates so-called pressure points and thus feels "sharper" and less comfortable, in a similar manner as lying on gravel or rocks.

Figure 4:
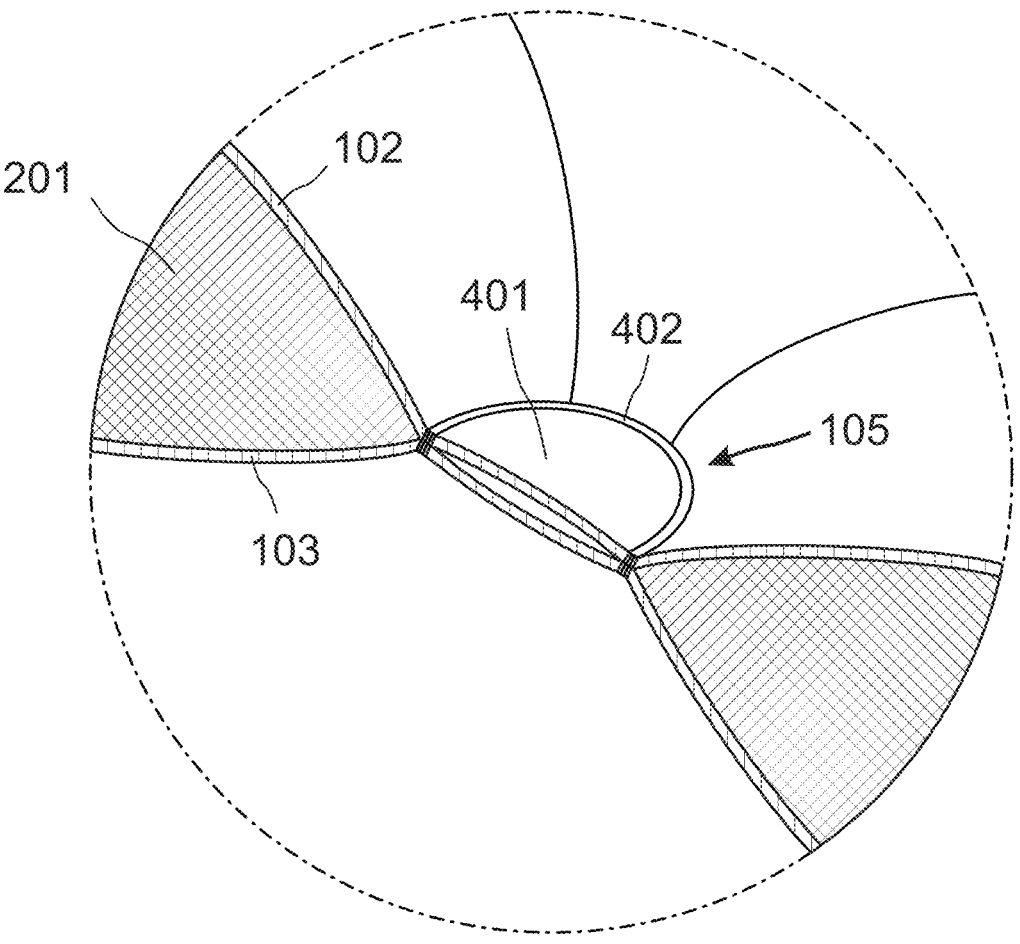
FIG. 4 shows a detail view of a drain according to embodiments.

FIG. 4 shows a detail view of a drain 105 according to embodiments. The detailed view corresponds to section C indicated in FIG. 2. The drains 105 may be formed by portions 401 of the casing 101 having an elevated or increased water permeability (e.g. compared to surrounding areas of the casing 101). For example, the upper layer 102 and/or the lower layer 103 may have portions 401 of elevated or increased water permeability.

This may be achieved by the upper layer 102 and/or lower layer 103 having a less dense weaving at portions 401 corresponding to the drains 105. It will, however, be appreciated that embodiments include other ways of increasing the water permeability of the casing at portions 401 corresponding to the drains 105.

The drains 105 may be confined by a surrounding seam 402. For example, a seam 402 may be provided around an edge of each of the drains 105. The seam 402 may join the upper layer 102 and the lower layer 103 of the casing 101. The seam 402 may be a woven joint or any other suitable joint for joining the upper layer 102 and the lower layer 103. The seam 402 may be configured to keep the sand 201 away from the drains 105, and in particular the portions 401, so as to ensures that the sand 201 cannot reach the drains 105. This allows the less dense weave to be used in the portions

401 of the drains 105 without allowing sand 201 to escape through the less dense weave.

The confining seam 402 may additionally function to reduce the thickness of the mattress 100 at the drains 105, so as to create a local or global minimum mattress thickness at the drains 105, as discussed previously.

An exemplary way of achieving a less dense wave at the drains 105, is by using floated threads in the weaving. That is, the fabric of the upper layer 102 and/or lower layer 103 of the casing 101 may, at portions 401 corresponding to the drains 105, be woven using floated threads. For example, the drains 105 may be woven using floated warp threads and/or floated weft threads. It will, however, be appreciated that other methods of achieving a less dense weaving are also included in embodiments.

Although a round or circular drain 105 is shown, it will be appreciated that the drains 105 may have any suitable shape including rectangular or square, oval or elliptical, polygonal, and/or an irregular shape.

Figure 5:
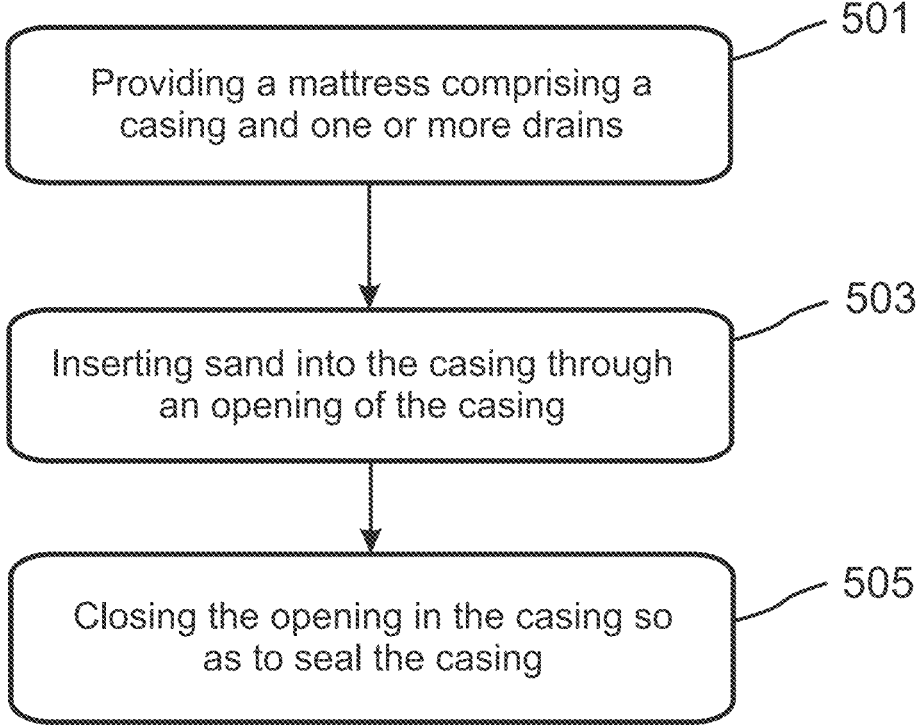
FIG. 5 shows a method of manufacturing a mattress according to embodiments.

FIG. 5 shows a method of manufacturing a mattress 100 according to embodiments.

In step 501, a mattress 100 is provided, the mattress 100 comprising a casing 101 and one or more drains 105. The drains 105 are configured to allow liquid to drain through the mattress 100 by having a larger water permeability than portions of the mattress 100 surrounding the drains 105.

In step 503, sand 201 is inserted into the casing 101 through an opening in the casing 101.

In step 505, the opening in the casing 101 is closed so as to seal the casing 101 and encase the sand 201.

Embodiments furthermore include use of the above-described mattress 100 in an agricultural environment, and in particular as a resting place for livestock.

Throughout this specification, the word "may" is used in a permissive sense (i.e. meaning having the potential to), rather than in the mandatory sense (i.e. meaning must).

Throughout this specification, the words "comprise", "include", and variations of the words, such as "comprising" and "comprises", "including", "includes", do not exclude other elements or steps.

As used throughout this specification, the singular forms "a", "an", and "the", include plural referents unless explicitly indicated otherwise. Thus, for example, reference to "an" element includes a combination of two or more elements, notwithstanding use of other terms and phrases for one or more elements, such as "one or more" or "at least one".

The term "or" is, unless indicated otherwise, non-exclusive, i.e. encompassing both "and" and "or". For example, the feature "A or B" includes feature "A", feature "B" and feature "A and B".

Unless otherwise indicated, statements that one value or action is "based on", "in response to" and/or "in dependence on" another condition or value or action, encompass both instances in which the condition or value or action is the sole factor and instances where the condition or value or action is one factor among a plurality of factors.

Unless otherwise indicated, statements that "each" instance of some collection have some property should not be read to exclude cases where some otherwise identical or similar members of a larger collection do not have the property, i.e. each does not necessarily mean each and every.

The invention claimed is:

1. A mattress for livestock, the mattress comprising:
   a casing at least partially filled with sand; and
   one or more drains provided in the casing and configured to allow liquid to drain through the mattress;

wherein a water permeability of the one or more drains is larger than a water permeability of the mattress at portions surrounding the drains;

wherein the casing includes a first layer and a second layer encasing the sand;

wherein the drains are formed by respective portions of a continuous layer of material forming at least one of the first and the second layers, the portions having an increased water permeability;

wherein the first layer and/or the second layer of the casing is made of a water permeable material;

wherein the first layer and/or the second layer of the casing is made of a woven material;

wherein the one or more drains are formed by portions of the first layer and/or the second layer having less dense weaving than surrounding portions of the first layer and/or the second layer; and wherein the one or more drains are formed by floating warp threads and/or floating weft threads in the first layer and/or the second layer.

2. The mattress according to claim 1, wherein each of the drains is confined by a seam between the first layer and the second layer.

3. The mattress according to claim 1, wherein the sand comprises silica and/or quartz.

4. The mattress according to claim 1, wherein at least 90 wt % of the sand has a grain size between 0.250 mm and 1.000 mm.

5. The mattress according to claim 1, wherein the sand has an average grain size between 0.354 mm and 0.707 mm.

6. The mattress according to claim 1, wherein the sand has a bulk density between 0.5 and 4 g per cubic centimetre.

7. The mattress according to claim 1, wherein the casing is made from a polymer material.

8. The mattress according to claim 1, wherein an inside of the casing comprises a plurality of compartments, wherein each compartment is substantially filled with sand.

9. The mattress according to claim 1, wherein the casing comprises an opening that can be repeatedly opened and closed.

10. A method of manufacturing a mattress for livestock, the method comprising:

providing a mattress having a casing and one or more drains, the drains being configured to allow liquid to drain through the mattress, wherein a water permeability of the one or more drains is larger than a water permeability of the mattress at portions surrounding the drains;

and filling the casing with sand;

wherein the casing includes a first layer and a second layer encasing the sand;

wherein the drains are formed by respective portions of a continuous layer of material forming at least one the first and the second layers, the portions having an increased water permeability;

wherein the first layer and/or the second layer of the casing is made of a water permeable material;

wherein the first layer and/or the second layer of the casing is made of a woven material;

wherein the one or more drains are formed by portions of the first layer and/or the second layer having less dense weaving than surrounding portions of the first layer and/or the second layer; and wherein the one or more drains are formed by floating warp threads and/or floating weft threads in the first layer and/or the second layer.

* * * * *